United States Patent [19]
Dufal et al.

[11] Patent Number: 5,729,487
[45] Date of Patent: Mar. 17, 1998

[54] ELECTRONIC COMPONENT CAPABLE, IN PARTICULAR, OF PERFORMING A DIVISION OF TWO NUMBERS TO THE BASE 4.

[75] Inventors: Frédéric Dufal, Grenoble; Xavier Robert, Tournefeuille, both of France

[73] Assignee: France Telecom, France

[21] Appl. No.: 569,819

[22] Filed: Dec. 8, 1995

[30] Foreign Application Priority Data

Dec. 22, 1994 [FR] France .................................. 94 15504

[51] Int. Cl.$^6$ .................................................. G06F 7/52
[52] U.S. Cl. ............................................................ 364/767
[58] Field of Search ........................ 364/715.01, 715.04, 364/745, 736, 761, 764, 766, 767

[56] References Cited

U.S. PATENT DOCUMENTS

| | | | |
|---|---|---|---|
| 5,007,009 | 4/1991 | Azetsu | 364/764 |
| 5,105,378 | 4/1992 | Mori | 364/761 |
| 5,128,891 | 7/1992 | Lynch et al. | 369/767 |
| 5,420,809 | 5/1995 | Read et al. | 364/715.01 |

FOREIGN PATENT DOCUMENTS

| | | |
|---|---|---|
| 666 449 | 11/1995 | Belgium . |
| 637 707 | 4/1990 | France . |

OTHER PUBLICATIONS

International Journal of Electronics, vol. 64, No. 6, Jun. 1988, pp. 885–896.

*Primary Examiner*—Chuong Dinh Ngo

[57] ABSTRACT

The component essentially includes three subtracter operators (ST1-ST3) connected between two multiplexers (MUX1, MUX2), associated with a shifter (DEC) for shifting the dividend and a concatenator means (MCT) for delivering the successive partial dividends from the contents of an output flip-flop (B3) and from the successive shifted words (S). The final-result word is stored in a shift register (RG). The component may be applied to image processing.

15 Claims, 14 Drawing Sheets

ELECTRONIC COMPONENT CAPABLE, IN PARTICULAR, OF PERFORMING A DIVISION OF TWO NUMBERS TO THE BASE 4.

BACKGROUND OF THE INVENTION

The invention relates to an electronic component capable of performing at least one division of two binary numbers to the base $2^b$, b being an integer greater than 1, in particular a binary division to the base four, and possibly of other mathematical operations on choice, such as for example a "difference of two numbers" function and/or a thresholding function and/or an "absolute value" of a difference function.

It applies advantageously but not limitingly to the fields of audio and video processing (where the calculation of divisions is necessary for quantization, a function which is provided for in all signal compression systems), or else to the estimation of motion for the coding of images.

SUMMARY OF THE INVENTION

Such components are not known at present.

The invention therefore proposes in a very general manner an electronic component, capable of performing at least one binary division of two numbers to the base $2^b$, b being an integer greater than one, in particular equal to two, comprising $2^b-1$ subtracters connected to the input of the component, controllable means of shifting binary words, connected to the input of the component, controllable means of concatenating binary words, connected up between the output of the shifting means and the output and the input of the subtracters, as well as a shift register for receiving in succession partial-result words of b bits together forming a final-result word representative of the division to the base $2^b$ of the two numbers. In the sense of the present invention, the word "subtracter" should be interpreted broadly as signifying in a general manner an "operator" capable of performing a subtraction. Thus, such a subtracter may be embodied via a straightforward subtracter or else via an arithmetic and logic unit.

More particularly, the invention proposes an electronic component comprising, b being an integer greater than 1, in particular equal to 2, $2^b-1$ subtracters intended to receive $2^b-1$ first words respectively equal to the $2^b-1$ successive multiples of a chosen positive divisor, and $2^b-1$ second words. Selection means are able to select, from among the $2^b-1$ output words from the subtracters and the $2^b-1$ second words, a partial-remainder word on the basis of an information item derived from the output words (for example from the value of the most significant bit (MSB) of the output words), and to associate therewith a corresponding predetermined partial-result word of b bits. Concatenation means are able to form a concatenated word from a first initial word shifted b bits towards the most significant bit and supplemented with the b least significant bits of a second initial word, and shifting means are able to form a succession of shifted words from successive shifts, with chosen value and direction of shift, of a chosen positive dividend.

Means for controlling this component are then able to deliver at least one ordered set of successive shift values, all associated with a direction of shift towards the least significant bit and decreasing successively from a chosen initial value while differing mutually by b bits, and then, at least if the initial shift value is not a multiple of b, at least one additional shift value equal to b and associated with a direction of shift towards the most significant bit. The control means then sequentially deliver successive second words respectively equal to the initially shifted dividend and then to the successive concatenated words (successive partial dividends) obtained respectively from the successive partial-remainder words, in the guise of first initial words, and from the successive shifted words, in the guise of second initial words. The control means store the successive partial-result words in the shift register, in such a way as to form the final-result word representative of the division to the base $2^b$, in particular to the base four, of the dividend by the divisor.

The component moreover advantageously comprises thresholding means delivering, in response to a base word, a base word thresheld by two threshold words representing minimum and maximum threshold values. Such a thresholding function can be implemented independently of the "division" function. Nevertheless, in combination with this division function, the thresholding of the final-result word makes it possible to validate this result within a desired dynamic range, that is to say a number of bits.

According to one embodiment, the thresholding means include two of the $2^b-1$ subtracters. One of the subtracters receives the minimum threshold value and the base word, whereas the other subtracter receives the maximum threshold value and the base word. They also include the said selection means. The latter possess a thresholding state in which they select the thresheld base word among the two threshold values and the base word depending on the said information item derived from the output words from these two subtracters.

Thus, the thresholding means deliver a thresheld final-result word from a base word derived from the contents of the shift register and from the two minimum and maximum threshold values taking into account the dynamic range desired for the final-result word.

According to one embodiment in which the numerical words processed by the component are 2's complement coded and the said information item derived from the output words from the subtracters is the result of comparing the most significant bits of these output words with the value 0 or 1.

The component can also comprise means for rounding the final-result word contained in the shift register. Such means receive the least significant bit of the word contained in the shift register as well as an information item representative of the comparison of the corresponding partial-remainder word with the value 0 or 1, and deliver a rounding bit.

According to one embodiment, the rounding means include controllable incrementing means for incrementing or not incrementing the final-result word contained in the shift register depending on the value of the rounding bit.

The component also preferably comprises means for determining the absolute value of a difference which are able to deliver, if appropriate, the positive divisor and/or positive dividend from a divisor and/or dividend of any signs received by an input port of the component. It also comprises sign retrieval means able to retrieve the sign of the final-result word from the sign of the divisor and from the sign of the dividend.

Such means make it possible to process numbers with any signs. Moreover, although the function for determining the absolute value of a difference is used here in combination with the function for dividing two numbers, it could be so in a totally independent manner.

The absolute value determining means advantageously include two of the $2^b-1$ subtracters. They also include the said selection means, possessing a so-called absolute value state in which these selection means select the output word from one of the two subtracters, depending on the said information item derived from the output words from these two subtracters.

The component according to the invention thus makes it possible in a single cycle to produce the absolute value of a difference of two numbers without previously producing the difference of these two numbers. Of course, if one of these two numbers is taken equal to zero, the absolute value of the other number is then produced.

According to a preferred embodiment, the component comprises an input port for receiving some at least of the data to be processed by the component, an output port for delivering the data resulting from these processing operations and temporal storage means connected between the outputs and the inputs of the subtracters. The control means include control logic and input multiplexing means. The latter are input-connected to the said input port. They are output-connected to the inputs of the subtracters, and are controlled by the said control logic. The selection means include means for comparing the most significant bits of the output words from the subtracters with the value 0 or 1, and output multiplexing means. The latter are input-connected to the outputs of the subtracters and to some of the outputs of the input multiplexing means. They are furthermore controlled by the said comparison means, and are connected, at output, to an input of the input multiplexing means via the concatenation means and shifting means.

The temporal storage means may include a first D flip-flop connected between the output multiplexing means and the output port, whereas the shifting means preferably include,

- a second D flip-flop, connected to an output of the input multiplexing means for storing the chosen positive dividend,
- first auxiliary multiplexing means connected, at input, to the output of the second D flip-flop, to the output of the first D flip-flop, and to the output of the input multiplexing means, and controllable by the said control logic,
- a shifter controllable by the said control logic and connected to the output of the first auxiliary multiplexing means,
- as well as a third D flip-flop connected to the output of the shifter so as to store the successive shifted words.

The concatenation means preferably include second auxiliary multiplexing means connected between the outputs of the first and third D flip-flops, and an input of the input multiplexing means.

According to a particularly advantageous embodiment of the invention, one of the subtracters is formed by an arithmetic and logic unit.

This arithmetic and logic unit can thus incorporate the absolute value determining means and at least a part of the sign retrieval means.

The component according to the invention may thus be integrated in particular into any processor incorporating an arithmetic and logic unit processing fixed point numbers within a synchronous environment. This component thus makes it possible to extend the capabilities and performance of a processor, to guarantee the validity of the calculation and possibly to conduct two computations in parallel.

In other words, particular instructions carrying out segments of division to the base 4 (the calculation of 2 bits at each iteration), calculating the maximum/minimum of two numbers, the thresholding of a number, the absolute value of a difference, supplement the conventional instructions of an arithmetic and logic unit.

The component according to the invention can thus be integrated into any processor, especially a signal processor, used in applications which relate essentially to the fields of audio and video processing (where the calculation of divisions is necessary for quantization, a function provided for in all signal compression systems. Moreover, the calculation of a difference of absolute value is often used in motion estimation algorithms for the coding of images.

It is particularly advantageous for the component to comprise means for extending the size of the internal data paths of the component, with respect to the size of the external input data paths to which the said component is connected.

In other words the various processing operations formed within the component are so on a greater number of bits than that over which the input data are coded. Any internal overflows are thus handled intrinsically, whereas in conventional arithmetic and logic units such overflows are handled by exception routines providing for example for the updating of a "flag", that is to say the updating of a particular bit in a state register.

Furthermore, a widening of the internal data paths, which, although advantageous for a component capable of carrying out a division to the base four since it offers the possibility of performing internal calculations (reusing a previous calculation), for example internal divisions, without any risk of overflow, is not absolutely indispensible to such a component, makes it possible in combination with just two subtracters to produce a component which offers a thresholding function while minimizing the post-thresholding calculational inaccuracies.

Other advantages and characteristics of the invention will emerge on examining the detailed description of an entirely non-limiting embodiment illustrated in the attached drawings in which:

DETAILED DESCRIPTION OF THE INVENTION

Although the invention is not limited thereto, a component will now be described which is capable of performing, in particular, a division to the base 4 of two numbers.

Figure 1:
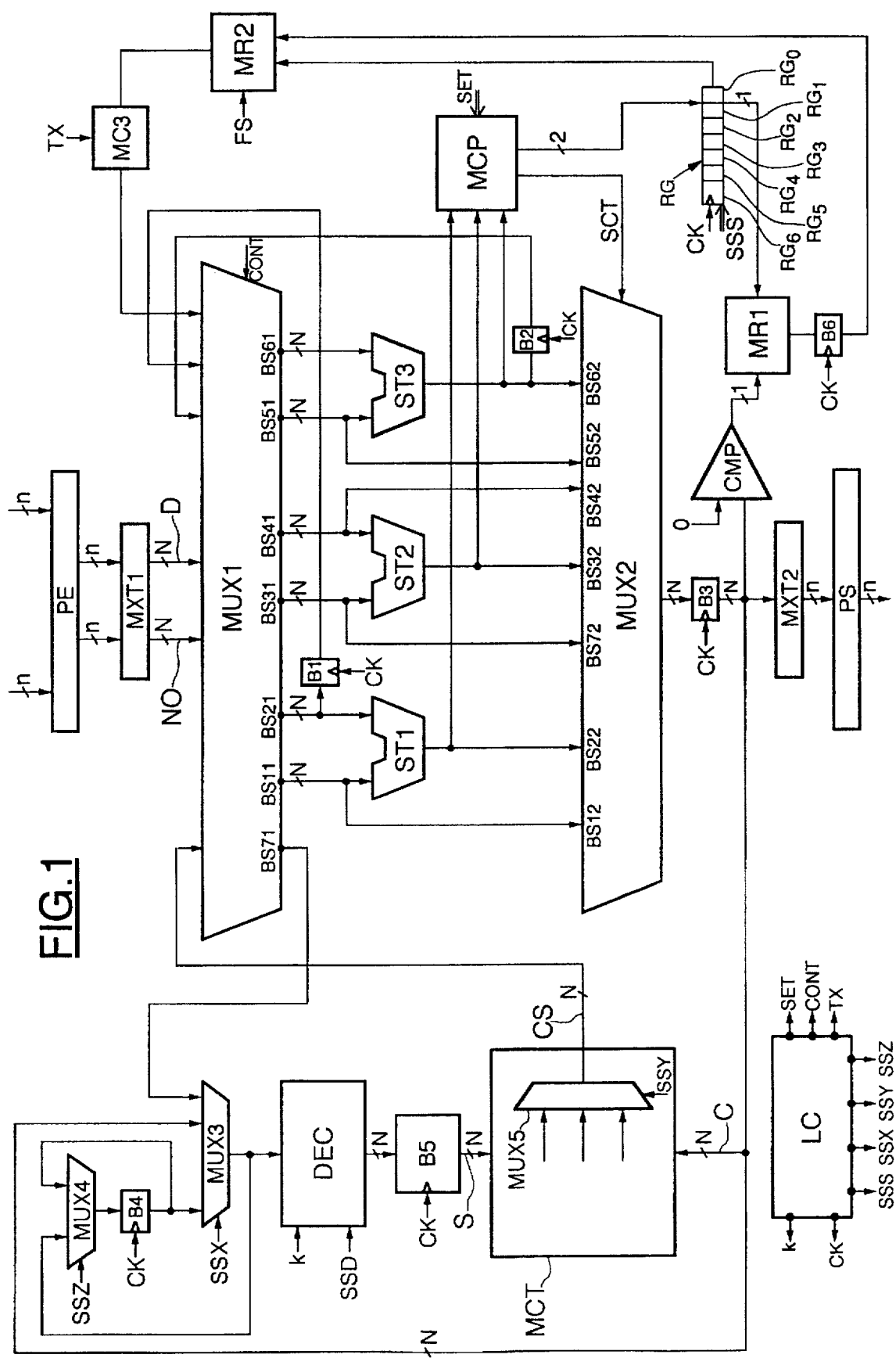
FIG. 1 is a schematic overview of an embodiment of the component according to the invention.

As illustrated in FIG. 1, the architecture of such a component, produced for example from discrete components and/or integrated circuitry, essentially revolves around three subtracters ST1–ST3 connected between input multiplexing means, reference MUX1, and output multiplexing means, reference MUX2.

The outputs of these three subtracters are also connected to comparison means MCP, the functionality of which will be returned to in more detail below, which are able to deliver a signal SCT for controlling the output multiplexer MUX2, as a function of the value of an information item derived from the output words from the subtracters, the significance of which will be returned to in more detail below, and as a function of a state control signal SET delivered by control logic LC.

When the state word SET corresponds to a division mode of operation, the means MCP moreover deliver a two-bit word representative of the partial result of a segment of division. This partial-result word is stored in a shift register RG clocked by a clock signal CK and controlled by a control signal SSS. As will be seen in more detail below, on completing a division operation, contents of the shift register will be representative of the word of the final result of the said division.

The output of the multiplexer MUX2 is connected to a temporal storage means B3, such as a D flip-flop clocked by the clock signal CK.

The output of this temporal storage means is looped back to one of the inputs of the multiplexer MUX1 via shifting means and concatenation means MCT.

The shifting means essentially revolve around a shifter DEC capable of shifting by a shift value k, and in a direction of shift SSD, both provided by the control logic LC, a base word presented to its input, so as to deliver a shifted word S and store it in a specific register B5, such as a D flip-flop, clocked by the clock signal CK.

The base word input to the shifter DEC is in fact the contents of another specific register B4, such as a D flip-flop, clocked by the signal CK, connected to the input of the shifter DEC by a multiplexer MUX3 controlled by the signal SSX.

The output of the flip-flop B4 on the one hand and the output of the multiplexer MUX3 on the other, are looped back to the input of the flip-flop B4 by another multiplexer MUX4 controlled by the control signal SSZ.

The output of the flip-flop B3 as well as the output terminal BS71 of the multiplexer MUX1 are connected to the two inputs of the multiplexer MUX3.

The concatenation means MCT essentially revolve around a multiplexer MUXS, controlled by the control signal SSY, and input-connected, on the one hand to the output of the flip-flop B5 and, on the other hand, to the output of the flip-flop B3. The output of these concatenation means delivers a concatenated word CS to one of the inputs of the multiplexer MUX1.

In general, as will be seen in more detail below, when they are active, the concatenation means MCT deliver a concatenated word, or partial dividend, CS from the shifted word S stored in the flip-flop B5, and from the partial-remainder word C stored in the flip-flop B3. More precisely, the concatenated word CS is obtained by shifting the partial-remainder word C, by two bits to the left, that is to say towards the most significant bit (MSB), the two least significant bits of this concatenated word then being the two least significant bits of the shifted word S contained in the flip-flop B5.

The component furthermore includes rounding means possibly delivering a rounding bit for the final-result word contained in the shift register RG.

These rounding means include a comparator CMP comparing the contents of the flip-flop B3 with the value zero so as to deliver a comparison bit which, alongside the least significant bit of the final-result word contained in the shift register RG, will be utilized in the means MR1 capable of taking various configurations as a function of the nature of the desired rounding, so as to deliver a rounding bit having the value zero or 1, in a D type flip-flop, reference B6.

These rounding means furthermore include means, reference MR2, computing the rounded final result from the contents of the shift register RG and from the value of the rounding bit contained in the flip-flop B6. Moreover, these means MR2 also make it possible to retrieve the sign of the result, on the basis of a control signal SS, taking into account the initial sign of the dividend NO and of the divisor D.

In the loopback from the shift register RG to the input of the multiplexer MX1, there are also provided means MC3, controlled by a control signal TX intended, as will be seen in more detail below, to extract on command as a function of the parity of the initial shift value k, the significant bits desired for the final result.

Furthermore, certain inputs of the output multiplexer MUX2, such as the inputs BE12, BE42, BE52 and BE72 are connected directly to certain of the outputs of the multiplexer MUX1, such as the outputs BS11, BS41, BS51 and BS31.

Two special registers are also provided, such as D flip-flops reference B1 and B2, connected respectively between the output terminal BS21 of the multiplexers MUX1 and one of its inputs, and between the output of the subtracter ST3 and one of the inputs of the multiplexer MUX1.

Provided at the input of this component is an input port PE composed for example of a plurality of input registers such as D flip-flops intended to receive input data words of n bits.

Likewise, an output port PS is provided for outputting words of n bits, after processing by the component.

However, means MXT1 are advantageously provided for extending the size of the internal data paths of the component, so that an input word of n bits is extended to N bits by supplementing the word of n bits to the left of the most significant bit, with N-n bits equal to the MSB of the word of n bits. Of course, homologous means MXT2 for reducing the number of bits of the words are provided immediately upstream of the output port PS. The benefit of this extension of the size of the internal data paths of the component will be returned to in more detail below.

In the foregoing account, and in accordance with FIG. 1, terms such as multiplexer, flip-flop, subtracter were employed for the purposes of simplification as if they were single elements, whereas they are adapted so as to be connected up to N-bit internal data paths. In fact, as illustrated more precisely in FIGS. 2 to 5, each subtracter can be composed of a group of N one-bit subtracters, cascaded.

Figure 2:
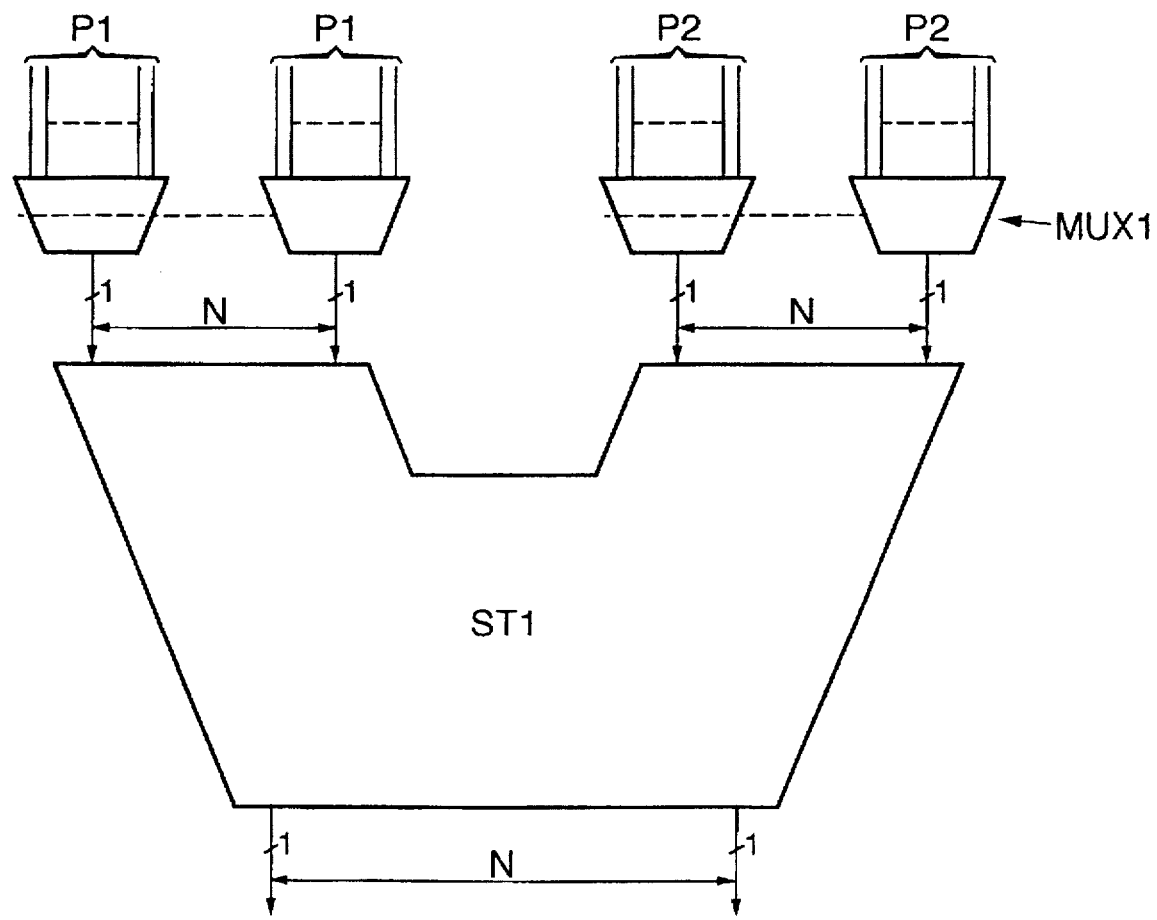
FIGS. 2 to 5 illustrate certain elements of the component of FIG. 1 in more detail.

Likewise, the input multiplexer MUX1, for example, is in fact composed of at least as many multiplexers as there are bits entering the subtracters (FIG. 2). All the multiplexers connected to the same input of a subtracter should however have the same number of input terminals (P1 or P2) as illustrated in FIG. 2.

Likewise, the various flip-flops of the component can be N one-bit flip-flops connected in parallel.

Figure 3:
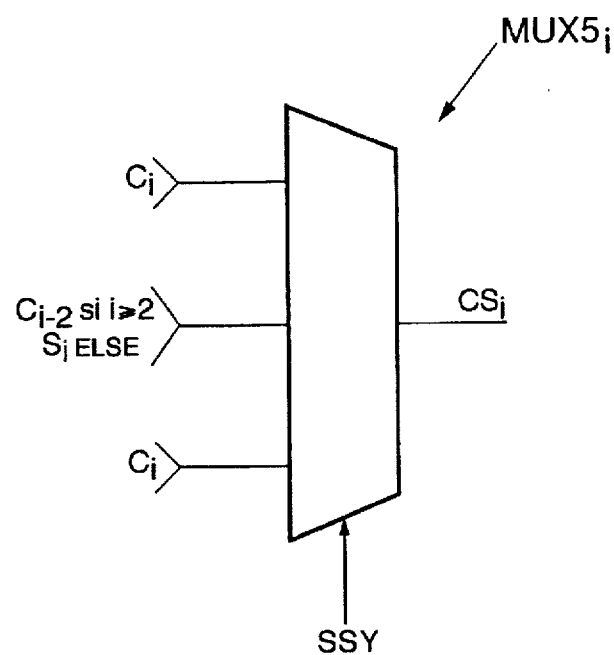

With regard to the concatenation means MCT, these in fact consist in the example embodiment illustrated here, of N multiplexers MUX5, wired up as illustrated in FIG. 3. More precisely, the $i^{th}$ multiplexer $MUX5_i$ receives on a first input the $i^{th}$ bit $S_i$ of the shifted word S. It furthermore receives, in a hard-wired manner, on a second input, either the $i-2^{th}$ bit of the word C contained in the flip-flop B3, if i is greater than or equal to 2, or the $i^{th}$ bit $S_i$ of the shifted word contained in the flip-flop B5, if i is equal to 0 or 1. Finally, a third input of the multiplexer $MUX5_i$ receives the $i^{th}$ bit $C_i$ of the word contained in the flip-flop B3.

Thus, the output word CS from the multiplexers MUX5 is either equal to the shifted word S if the multiplexers are switched over to the first input, or to the concatenated words if they are switched over to the second input, i.e. to the word C contained in the flip-flop B3.

Figure 4:
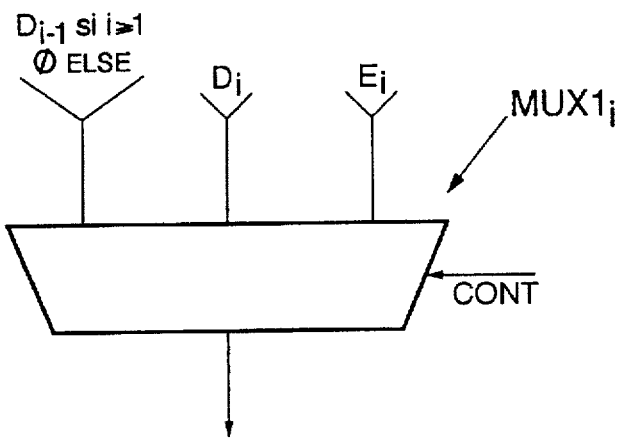

The operation of the component according to the invention in the case of a division of two numbers to the base 4 will now be described in detail whilst referring more particularly to FIGS. 4 et seq.

Figure 6:
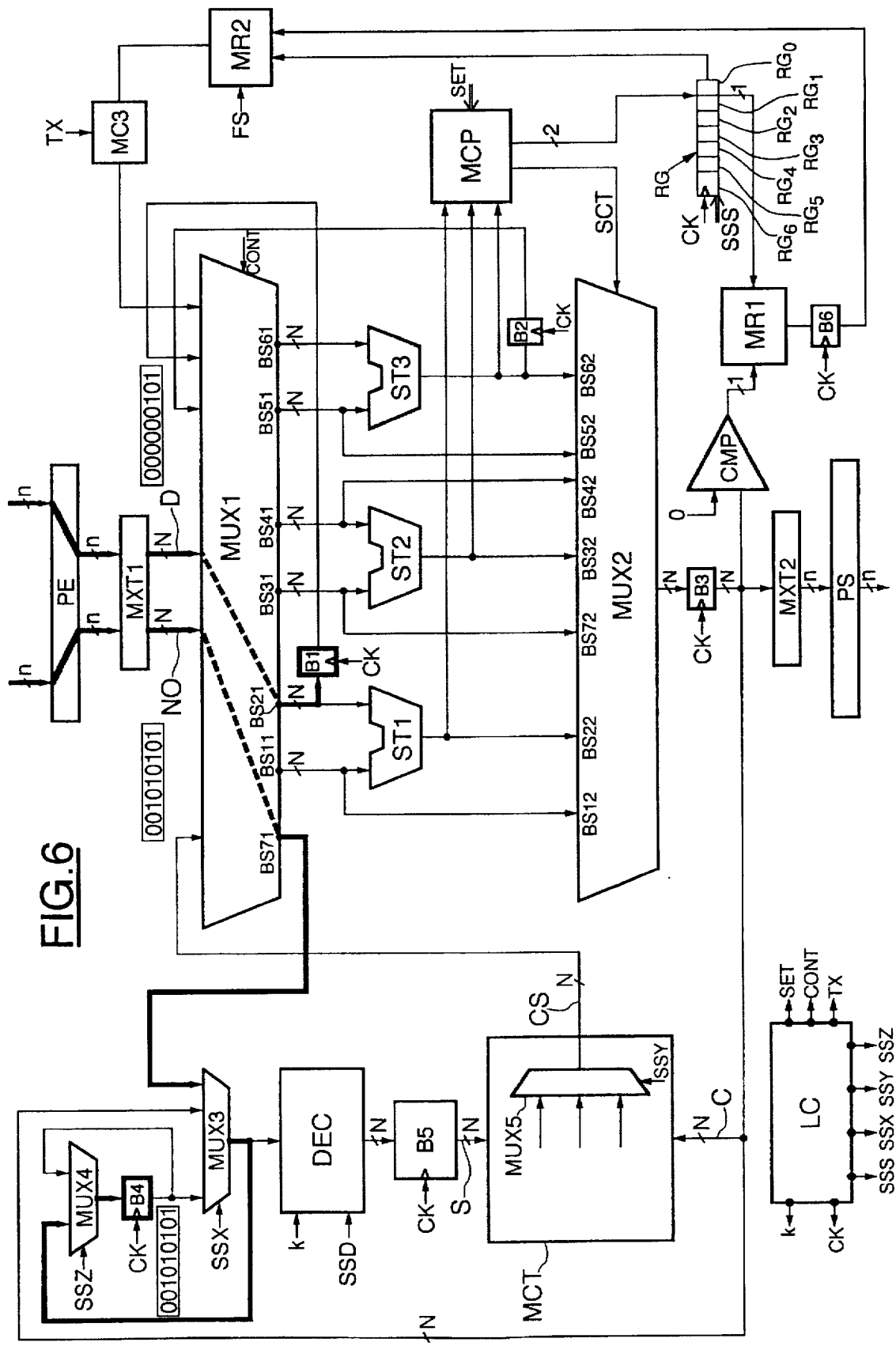
FIGS. 6 to 16 illustrate various operating cases of the component of FIG. 1.

In FIGS. 6 et seq., the main interconnections between the various elements of the component have been represented by bold lines for each step of the operation. These various interconnections at multiplexer level are obtained through appropriate commands thereof on the basis of corresponding control signals, and also on the basis of their special upstream wiring bearing in mind the significance of the data which will be applied to them. Those skilled in the art will readily know how to effect these various wirings based on an indication of the desired functional interconnections.

More precisely, as will be seen in more detail below, it is necessary, in a divisional mode of operation, to use the products 2D and 4D. Instead of using multipliers to determine these numbers, it has been deemed simpler to use special wiring, as illustrated in FIGS. 4 and 5, of certain multiplexers making up the input multiplexing means MUX1.

Thus, one of the inputs of the $i^{th}$ multiplexer $MUX1_i$, furthermore receiving the $i^{th}$ bit $D_i$ of the divisor D and the $i^{th}$ bit $E_i$ of another datum, is wired in such a way as to receive the $i-1^{th}$ bit $D_{i-1}$ of the divisor if i is greater than 1, or 0 if i is equal to zero. If the multiplexer $MUX1_i$ is switched over to this input, it will output the divisor D shifted by 1 to the left, that is to say towards the most significant bit, this corresponding to a multiplication of the divisor by 2.

Figure 5:
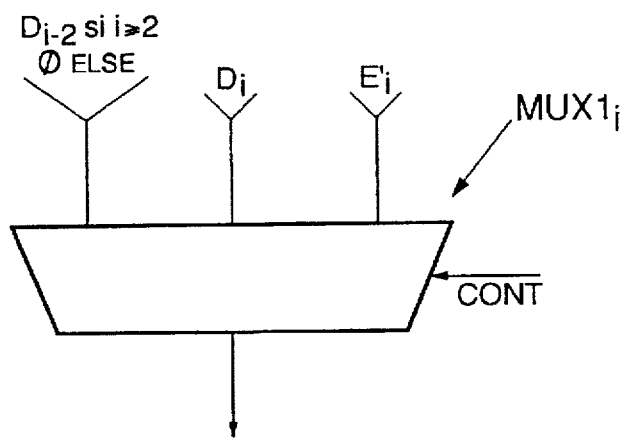

Likewise, as illustrated in FIG. 5, another $i^{th}$ multiplexer, or the same one, may have another input wired in such a way as to receive either the $i-2^{th}$ bit $D_{i-2}$ of the divisor, if i is greater than or equal to 2, or the value zero otherwise. These multiplexers will output the divisor shifted by two bits to the left, this corresponding to a multiplication by four of the divisor.

In the embodiment described here, the various data entering and leaving the component are 2's complement coded over n bits. In other words, if the bit of order zero denotes the least significant bit (LSB), the bit of order n−1, that is to say the most significant bit (MSB) represents the sign bit. If this sign bit has the value zero, then the number is positive and if it has the value 1, the number is negative.

Additionally, in a general manner, the information item derived from the output words from the subtracters and used by the means MCP to control the output multiplexer MUX2, is then the result of comparing the most significant bits of these output words with the value 0 or 1, this making it possible to determine whether these output words are negative or positive.

The operation of the component in division mode will now be described more precisely, assuming that it receives, in the guise of dividend NO, the number 85 and as divisor D the number 5. The dividend is then represented, over 8 bits for example, in 2's complement notation, by the digital word 01010101 whereas the divisor D is represented in the same notation by the digital word 00000101.

After passing through the extension means MXT1, the dividend NO is represented by an N-bit word (N=9 for example) obtained from the n-bit input word (n=8) by duplication of the sign bit (FIG. 6).

In a first step, the control logic LC instructs the multiplexers MUX1, MUX3 and MUX4 to store in the flip-flop B4 the 9-bit digital word representative of the dividend NO, and to store in the flip-flop B1 the 9-bit digital word representative of the divisor D.

Figure 7:
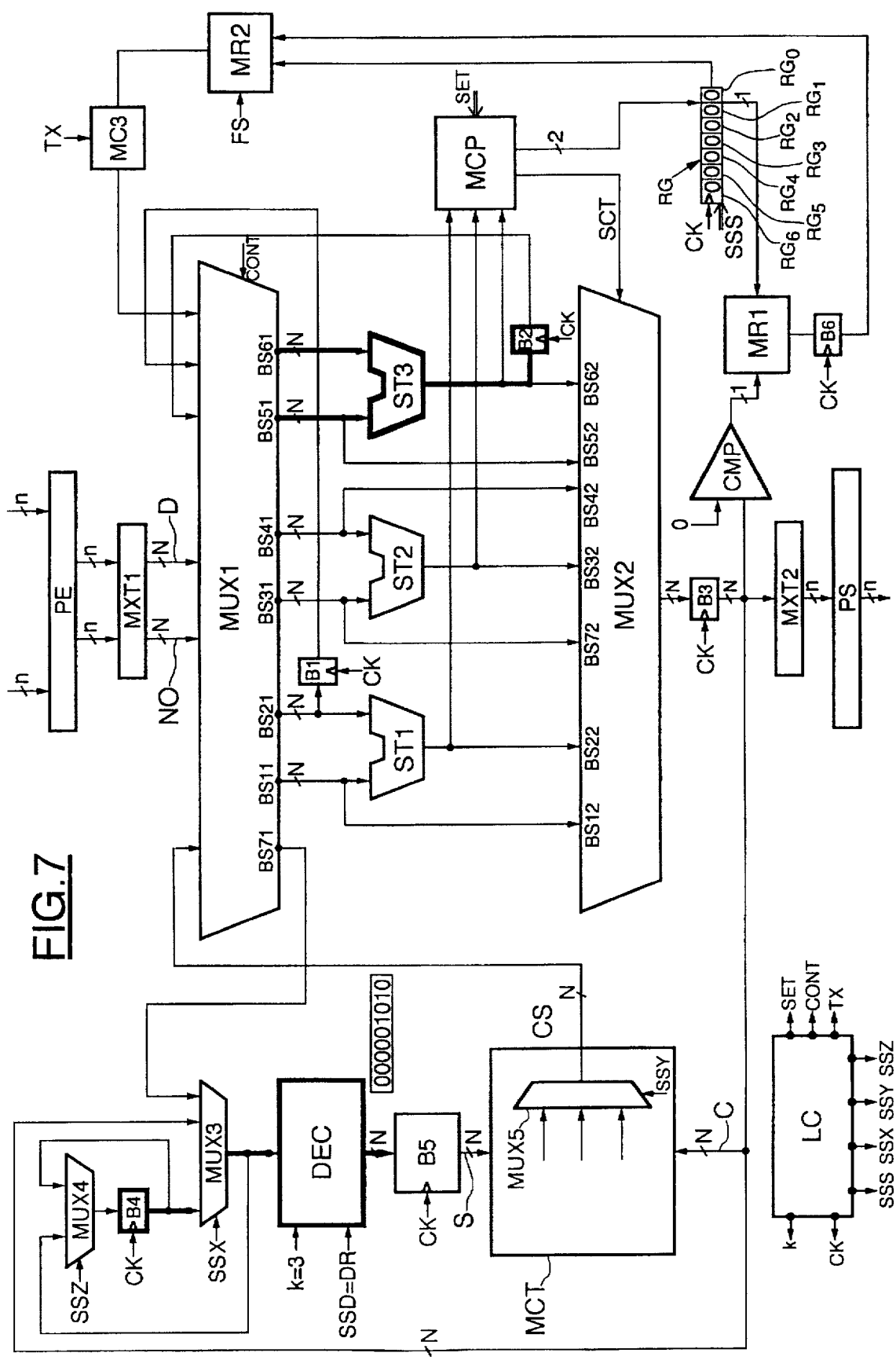

In the next step (FIG. 7) the control logic delivers to the shifter DEC an initial shift value k, equal to 3 in this example, which will in particular condition the number of bits in front of the decimal point of the final-result word contained in the shift register RG. Furthermore, the parity of k will implicitly automatically condition the obtaining or non-obtaining of a bit of the final-result word representative of a digit following the decimal point.

Thus, as will be seen in more detail below, if the initial shift value is odd, one at least of the bits of the final-result word contained in the shift register will be representative of a digit following the decimal point.

The shifter, furthermore instructed by the control logic to bring about a shift of the word contained in the flip-flop B4 to the right (SSD=DR), that is to say towards the least significant bit, therefore delivers, for the purposes of storage in the flip-flop B5, the shifted word S equal to 000001010.

Finally, during this cycle, the subtracter ST3, receiving the divisor D on its input BS61, and the number 4D on its input BS51, subtracts these two numbers so as to store the number 3D in the flip-flop B2.

Finally, the slots $RG_0$–$RG_N$ of the shift register G (for the purposes of simplification, only the first 7 slots $RG_0$–$RG_6$ have been represented) are initialized to zero.

Figure 8:
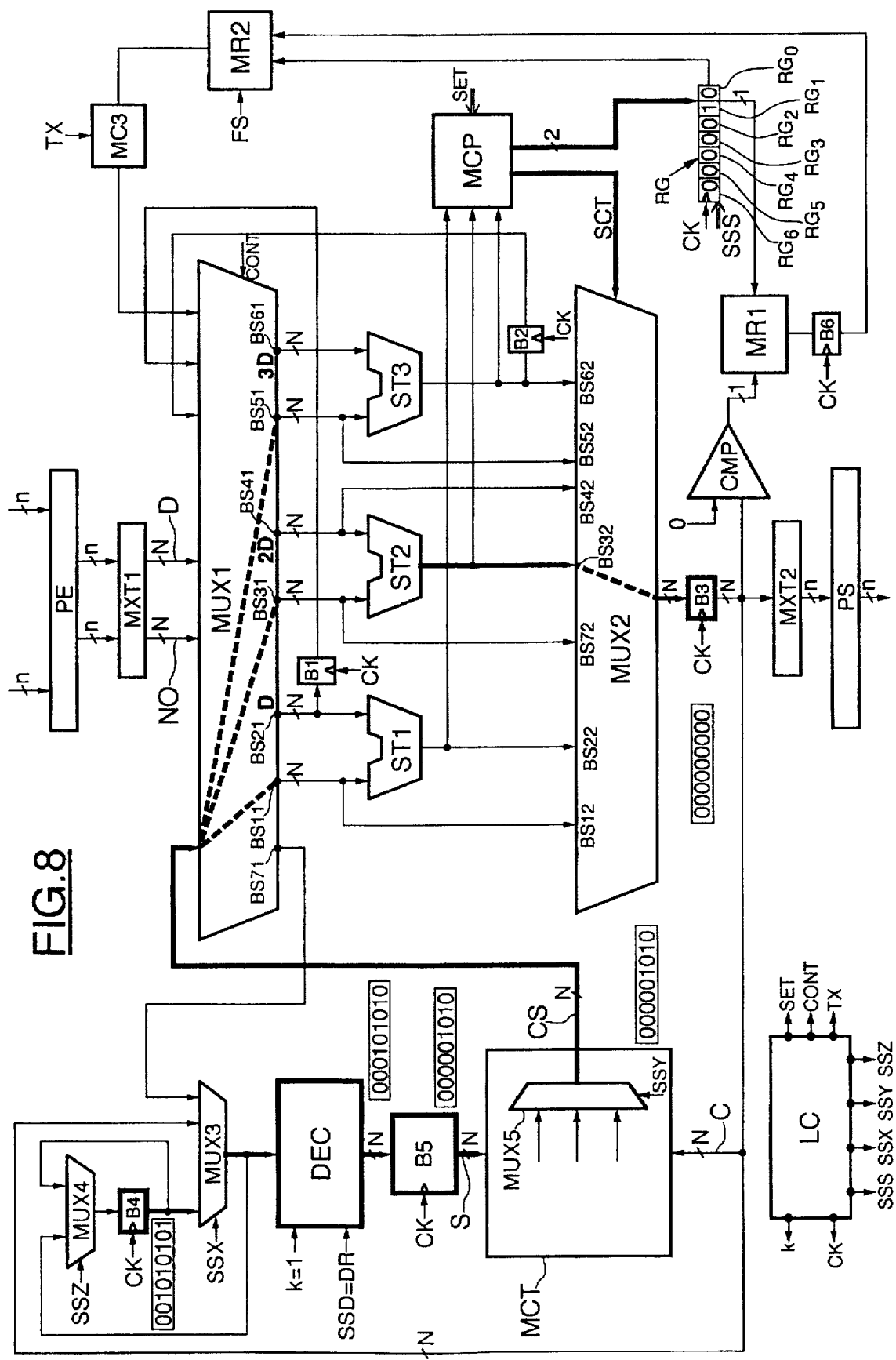

The next cycle, illustrated in FIG. 8, represents the first segment of division of the dividend NO by the divisor D.

Through the instructing of the multiplexer MUX1, the three successive multiples (D, 2D and 3D) of the divisor D are presented to the three respective inputs BS21, BS41 and BS61 of the subtracters ST1, ST2 and ST3.

Furthermore, simultaneously, through the instructing of the multiplexer MUX5, the shifted word S contained in the flip-flop B5, namely the word 000001010 is delivered to the other three respective inputs of the three subtracters.

The means MCP are then configured, in this divisional state of operation, so as to deliver as output from the multiplexer MUX2, either the partial dividend, here the shifted dividend, if the latter is strictly less than the divisor (condition a)) or the output word delivered by the first subtracter ST1, if the partial dividend is greater than or equal to the divisor and strictly less than twice the divisor (condition b)), or the output word from the second subtracter if the partial dividend is greater than or equal to twice the divisor and strictly less than three times the divisor (condition c)), or else the output word from the third subtracter if the partial dividend is greater than or equal to three times the divisor (condition d)).

Stated otherwise, the partial dividend is output by the multiplexer if the most significant bit of the output word from the first subtracter is equal to 1. Else, the output word from the first subtracter is output by the multiplexer MUX2 if the most significant bit of the output word from the second subtracter is equal to 1. Else, the output word from the second subtracter is output by the multiplexer MUX2 if the most significant bit of the output word from the third subtracter is equal to 1 and finally else, the output word from the third subtracter is output.

In tandem, the means MCP deliver a corresponding two-bit partial-remainder word which will be stored in the slots $RG_0$ and $RG_1$ of the shift register RG.

More precisely, the four partial-remainder words corresponding to the four conditions a), b), c), d) mentioned above are respectively equal to 00, 01, 10, 11.

During the cycle illustrated in FIG. 8, the partial dividend is equal to twice the divisor, hence it is the output word from the second subtracter, which is equal in this instance to 000000000 which is stored in the flip-flop B3 whereas the partial-result word 10 is stored in the shift register.

Next, the control logic LC delivers to the shifter DEC the next shift value, two bits less than the present shift value, in this instance equal to 1. The direction of the shift is retained. The dividend contained in the flip-flop B4 is then shifted one bit to the right so as to obtain a shifted word S, stored in the flip-flop B5, and equal to 000101010.

Figure 9:
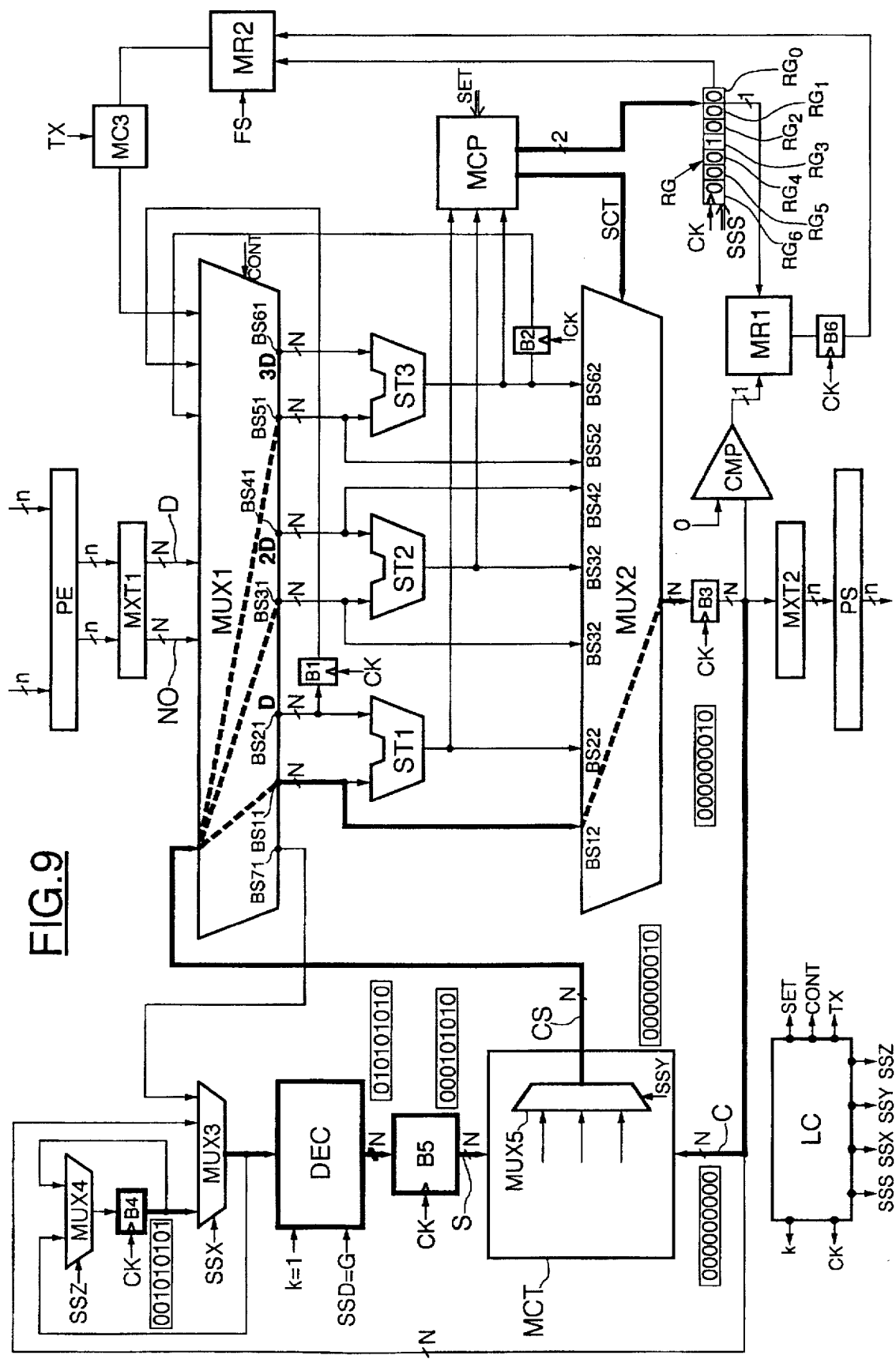

In the next cycle, illustrated in FIG. 9, the operations described above are repeated with the concatenated word (000000010) as partial dividend CS, obtained from the contents of the flip-flop B3 in the preceding cycle, (000000000) and from the shifted word S contained in the flip-flop B5 and here equal to 000101010.

Since this partial dividend CS is strictly less than D, it is output by the multiplexer MUX2, by way of example of the connection between the terminals BS11 and BE12, and stored in the flip-flop B3 as partial-remainder word.

In tandem, the corresponding partial-result word, in this instance, equal to 00, is stored in the two slots $RG_0$ and $RG_1$ of the shift register whereas the previous partial-result word, namely the word 10, is now stored in the slots $RG_2$ and $RG_3$.

The control logic LC then supplies a new shift value to the shifter DEC, which differs by two bits with respect to the previous shift value. However, given that k was odd and previously equal to 1, the new shift value is equal to 1 with the direction of shift reversed, that is to say towards the left or stated otherwise towards the most significant bit (SSD= G). As a consequence, the shifted word S contained in the flip-flop B5 is then at the end of this cycle, equal to the dividend shifted to the left 1 bit is supplemented at the level of the least significant bit with a zero.

In the next cycle, (FIG. 10) the division operations mentioned above are repeated for the next segment of division with, as partial dividend word CS, the concatenated word obtained (000001010) from the shifted word S equal to 010101010 and from the partial-remainder word C equal to 000000010, so as to give a partial-remainder word equal to 000000000 stored in the flip-flop B3, as well as a partial-result word equal to 10 stored in the slots $RG_0$ and $RG_1$ of the shift register RG.

Thus, at the end of this cycle, the contents of the shift register RG are representative of the final-result word of the division of the dividend NO by the divisor D.

However, since the initial shift value was odd, and since all the shift values were consequently odd, the bit contained in the slot $RG_0$ of the shift register is in fact the bit $Q_1$ of the word of the final result representative of the first digit following the decimal point. The bits $Q_0$, $Q_1$, $Q_2$, $Q_3$, $Q_4$ respectively stored in the slots $RG_1$–$RG_5$, represent the integer part of the final result of the division.

Of course, if the process were continued, that is to say if the control logic delivered a new shift value equal to 3 associated with a leftward direction of shift, a new final-result word would be obtained in the shift register RG, and would have an identical integer part but whose three bits stored in the slots $RG_2$, $RG_1$ and $RG_0$ would be representative respectively of the first three digits following the decimal point.

Those skilled in the art may note here that the division to the base 4 makes it possible to increase the gain in speed since the result requires less iteration than a division to the base 2. Indeed, in each cycle, two result bits are delivered instead of just one to the base 2.

Figure 10:
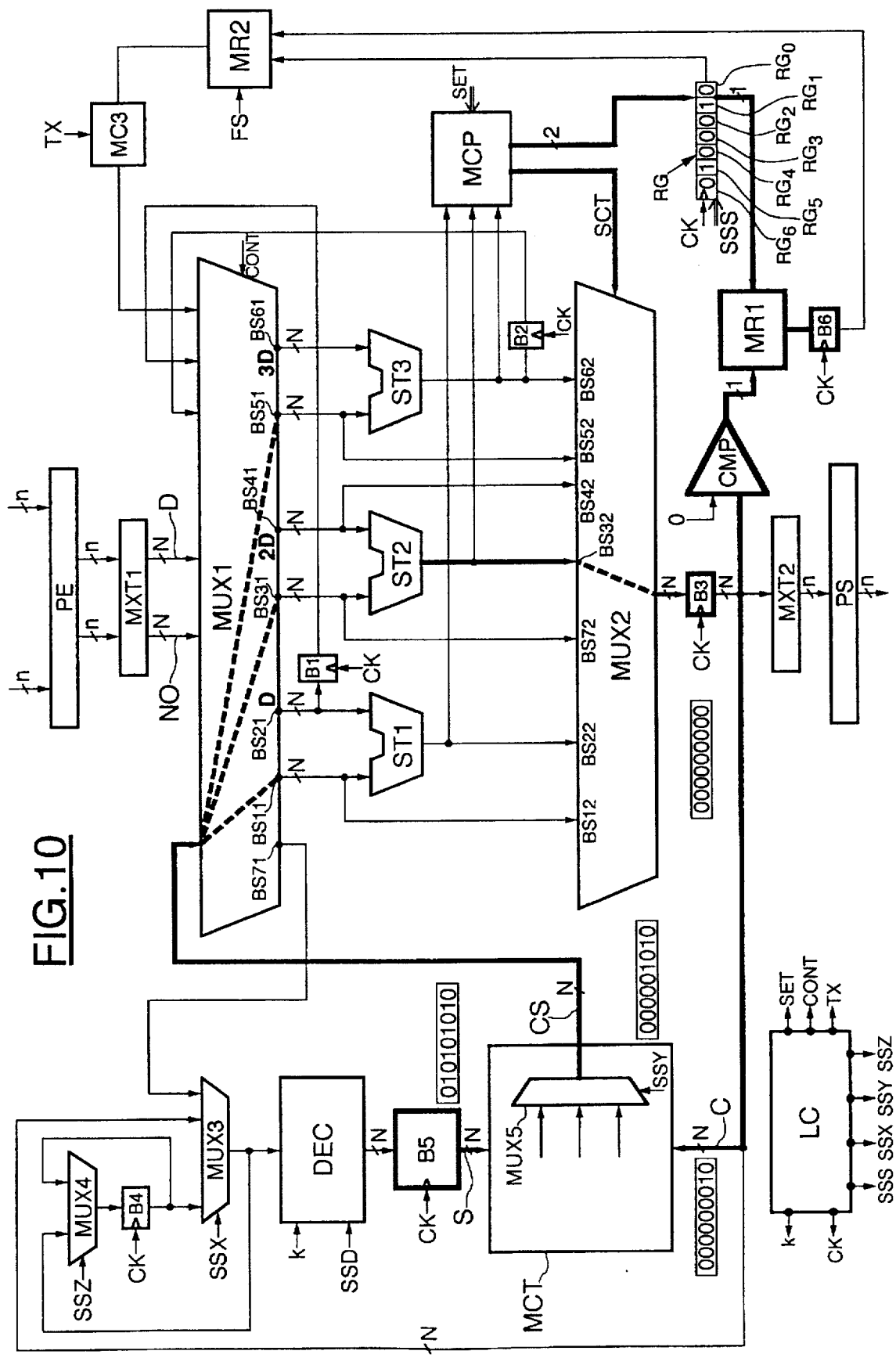

Before the end of the cycle illustrated in FIG. 10 a rounding bit is computed and stored in the flip-flop B6.

More precisely, the partial-remainder word finally stored in the flip-flop B3 during this cycle is compared in the comparator CMP with the value zero so as to deliver a comparison bit. Stated otherwise, comparison of the partial-remainder word with the value zero will determine whether the dividend was or was not a multiple of the divisor. Depending on the value of this comparison bit and on the value of the least significant bit of the final-remainder word contained in the shift register, that is to say contained in the slot $RG_0$, the means MR1 devised with the desired type of rounding in mind, will compute the rounding bit which will be stored in the flip-flop B6. In this instance, for example, in the presence of a comparison bit representative of a non-zero partial-remainder word, the rounding bit stored in the flip-flop B6 will equal zero if the least significant bit of the word contained in the shift register is equal to zero, and 1 otherwise. This amounts in the present case to rounding the result down to the next integer if the bit contained in the slot $RG_0$ is equal to zero or up to the immediately higher integer if the bit contained in slot $RG_0$ is equal to 1.

In the next cycle (FIG. 11) the means MR2 compute the rounded final-result word from the contents of the shift register RG and from the value of the rounding bit contained in the flip-flop B6. More precisely, the means MR2 sum the word contained in the shift register RG with the rounding bit contained in the flip-flop B6. In fact, this sum amounts to increasing or not increasing by 1 the final-result word which was contained in the register RG.

The means MC3 then make it possible, on the basis of the control signal TX which depends on the initial value of k and on its parity, to extract the integer part of the final-result word, in this instance the bits $Q_0$–$Q_4$ of this word. These means MC3 may quite simply be embodied by appropriate wiring between the slots of the register RG and the input multiplexer MUX1 in the case where the component only performs divisions on the basis of odd initial shift values which always lead to the same number of digits following the decimal point, or may include controllable multiplexers in the case where the initial shift values are parametral, both in terms of values and parities.

The final-result word is then stored in the flip-flop B3.

It proves to be particularly advantageous to then perform a thresholding operation on this final-result word so as to guarantee this result within the dynamic range desired by the user for the output words that is to say within the number of bits desired for these output words.

The parameters of a function for thresholding a number (or "clipping") are a minimum threshold value and a maximum threshold value. If the number lies between these two threshold values, the number thresheld by the said thresholding function is then equal to the number itself. On the other hand, if this number is greater than or equal to the maximum threshold value the thresheld number is equal to this maximum threshold value. Likewise, if the number is less than or equal to the minimum threshold value, the thresheld number is equal to this minimum threshold value.

Figure 11:
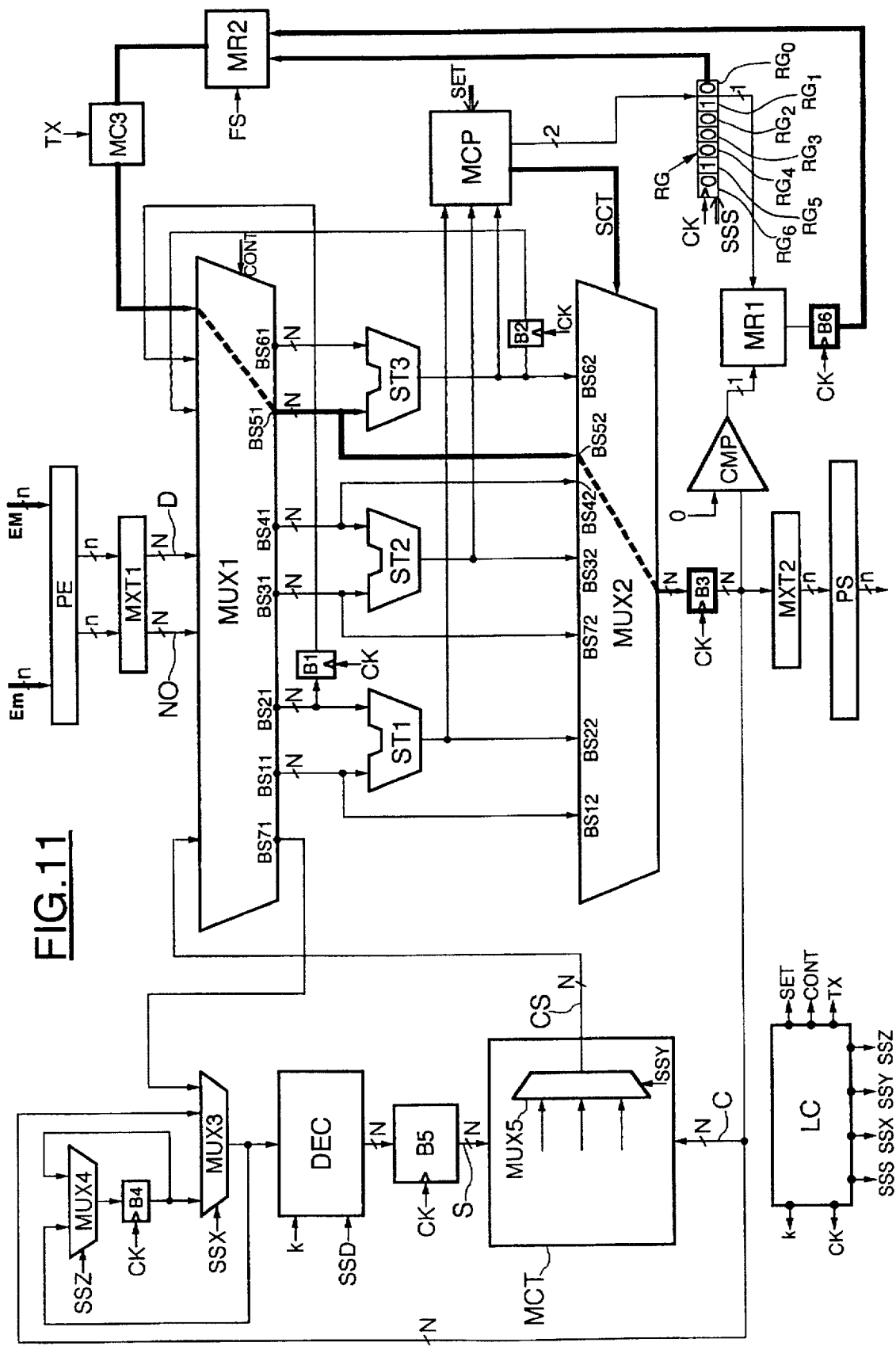

During the cycle illustrated in FIG. 11, the minimum threshold value Em, and the maximum threshold value EM, are sent to the input port PE.

In general, the thresholding means are embodied by two subtracters (one receives the minimum threshold value on one of its inputs and the number to be thresheld on its other input, whereas the other receives the maximum threshold value on one of its inputs and the number to be thresheld on the other input), and on the basis of the means MCP which analyze the most significant bit of the output words from the two subtracters so as to determine the position of the number to be thresheld with respect to the minimum and maximum threshold values.

More precisely, when the comparison means MCP are configured, with the aid of the control signal SET, so as to carry out this thresholding function, they instruct the multiplexer MUX2, with the aid of the signal SCT, so that this multiplexer outputs either the minimum threshold value or the maximum threshold value or the number itself.

Figure 12:
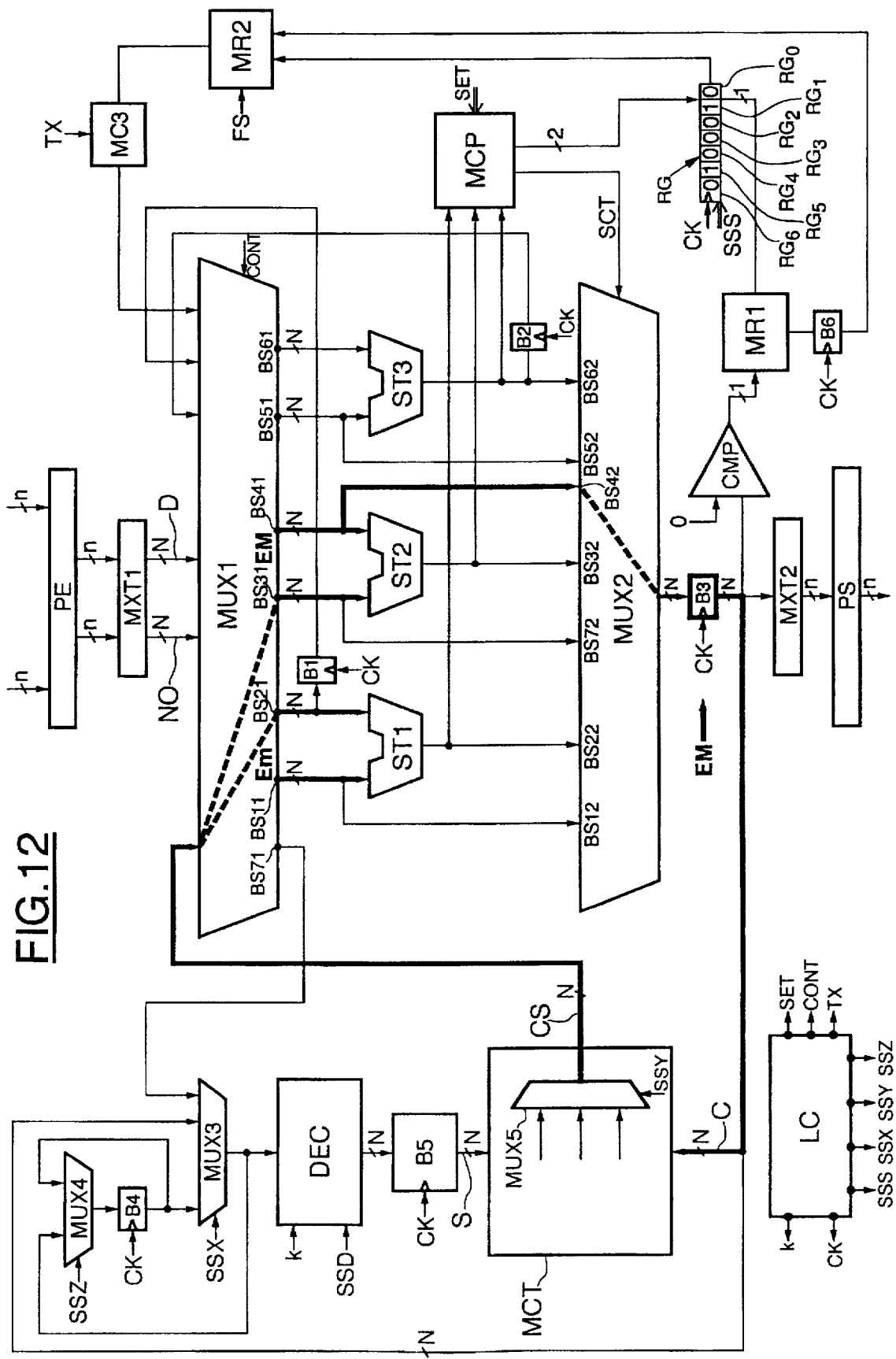

During the cycle illustrated in FIG. 12, and under the assumption of a desired output dynamic range of 4 bits, the maximum threshold value EM is equal (extended over 9 bits) to 000001111.

With the final-result word, after passing through the means MC3 being equal to 000010001, the means MCP select the terminal BS 42 and store the maximum threshold value EM in the flip-flop B3.

Had it been necessary, in another illustrative case, to select the minimum threshold value, it is the terminal BS12 which would have been selected, and had it been necessary to output the number itself from the multiplexer MUX2, it is the input terminal BS 72, connected directly to the input of the subtracter receiving the number itself, which would have been selected.

Those skilled in the art will therefore note here that the thresholding function makes it possible to guarantee the validity of the result, that is to say either to deliver the number itself, or to supply a result as close as possible to reality, by delivering either the maximum threshold value or the minimum threshold value.

In this instance, the maximum threshold value equal to 1111 is the value closest to the real result, therefore the least wrong. In the absence of thresholding means, an output dynamic range of 4 bits would have led to a result at output equal to 0001 (on the last four bits) which would have constituted a still more wrong result.

FIGS. 13 to 16 illustrate a configuration of operation in a division mode using even shift values k. The general principle of operation is the same as that which was described with reference to FIGS. 6 to 12. Only the differences with respect to these figures will now be described.

Figure 13:
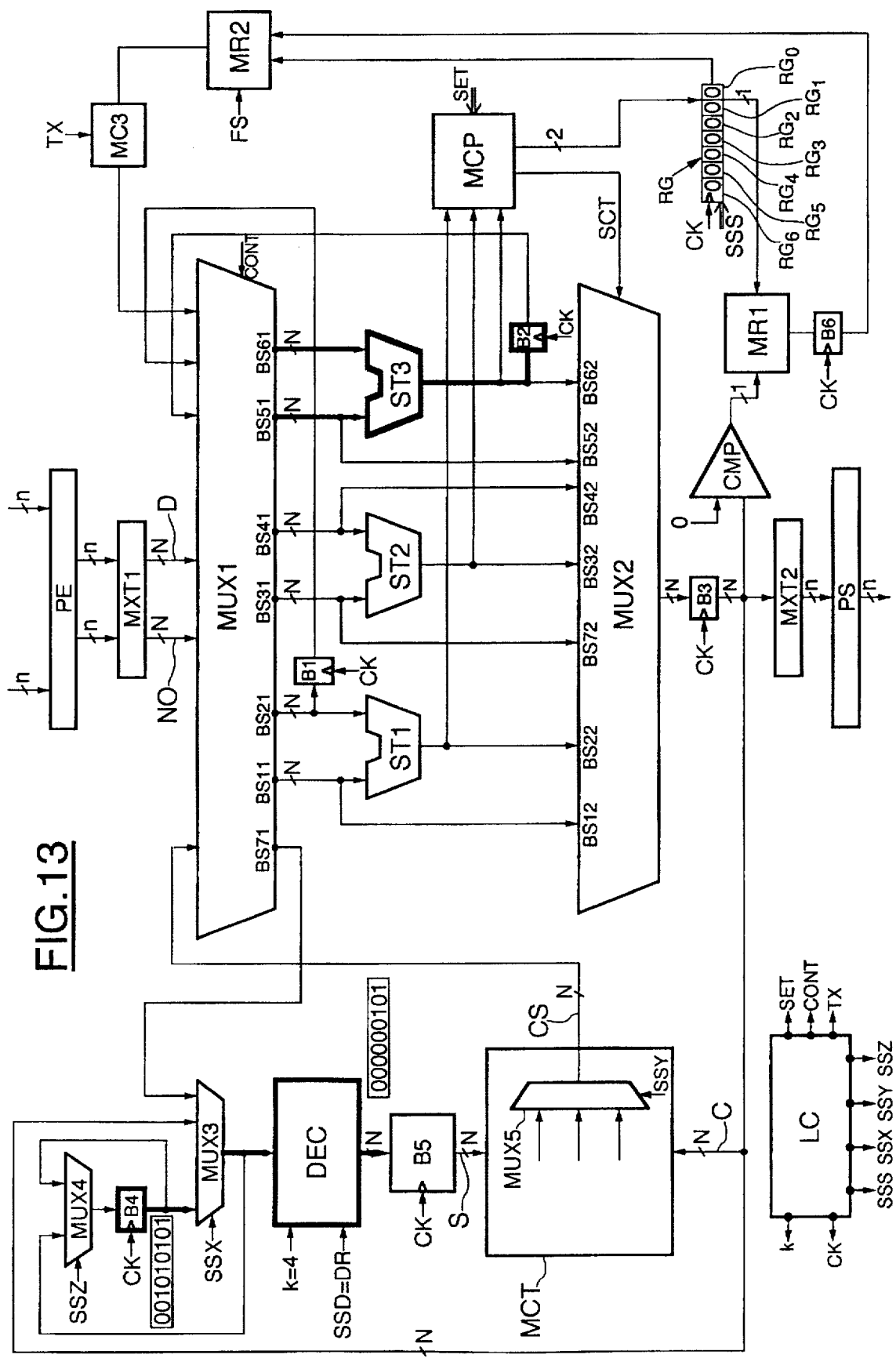
Figure 14:
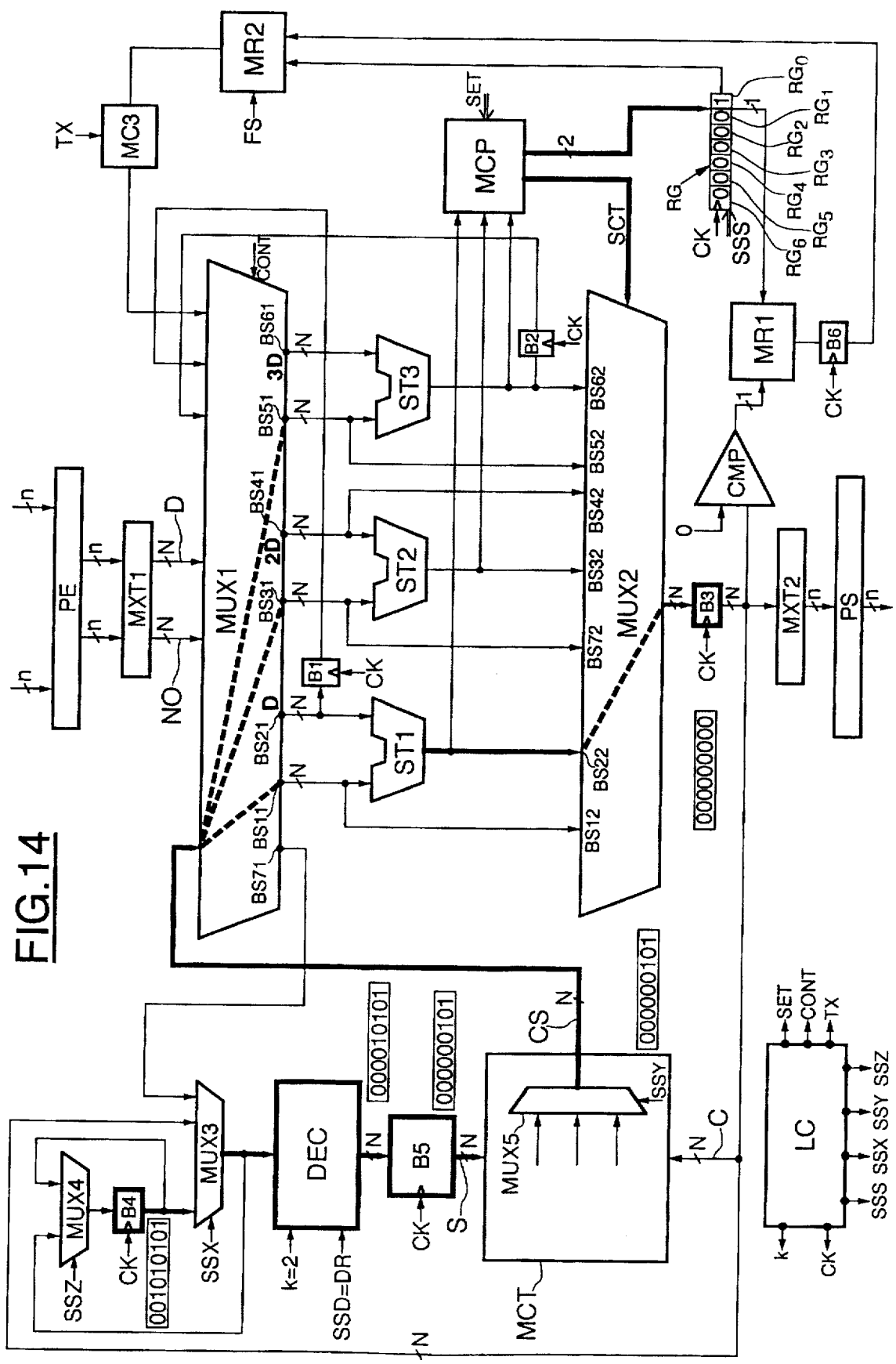
Figure 15:
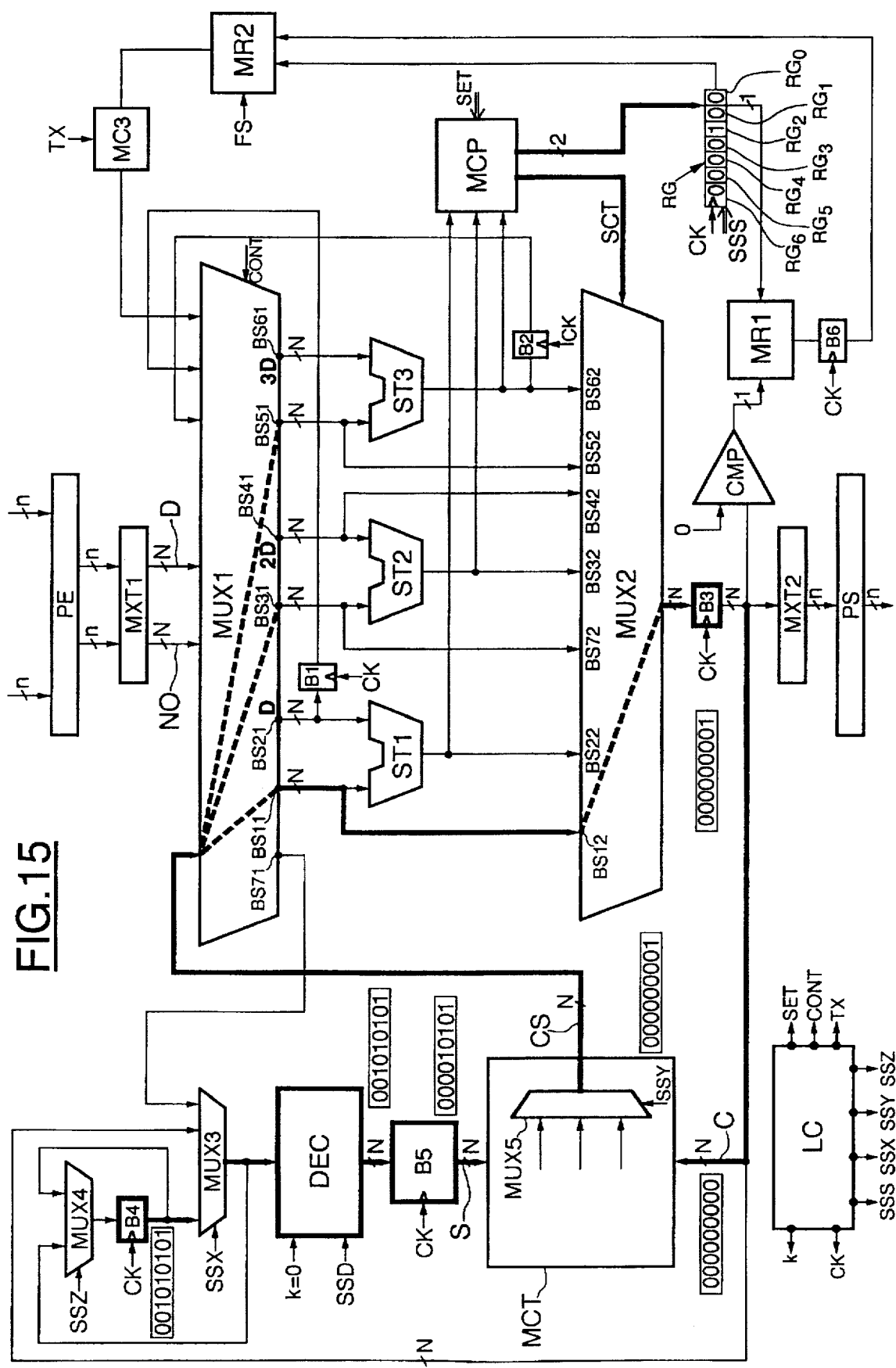
Figure 16:
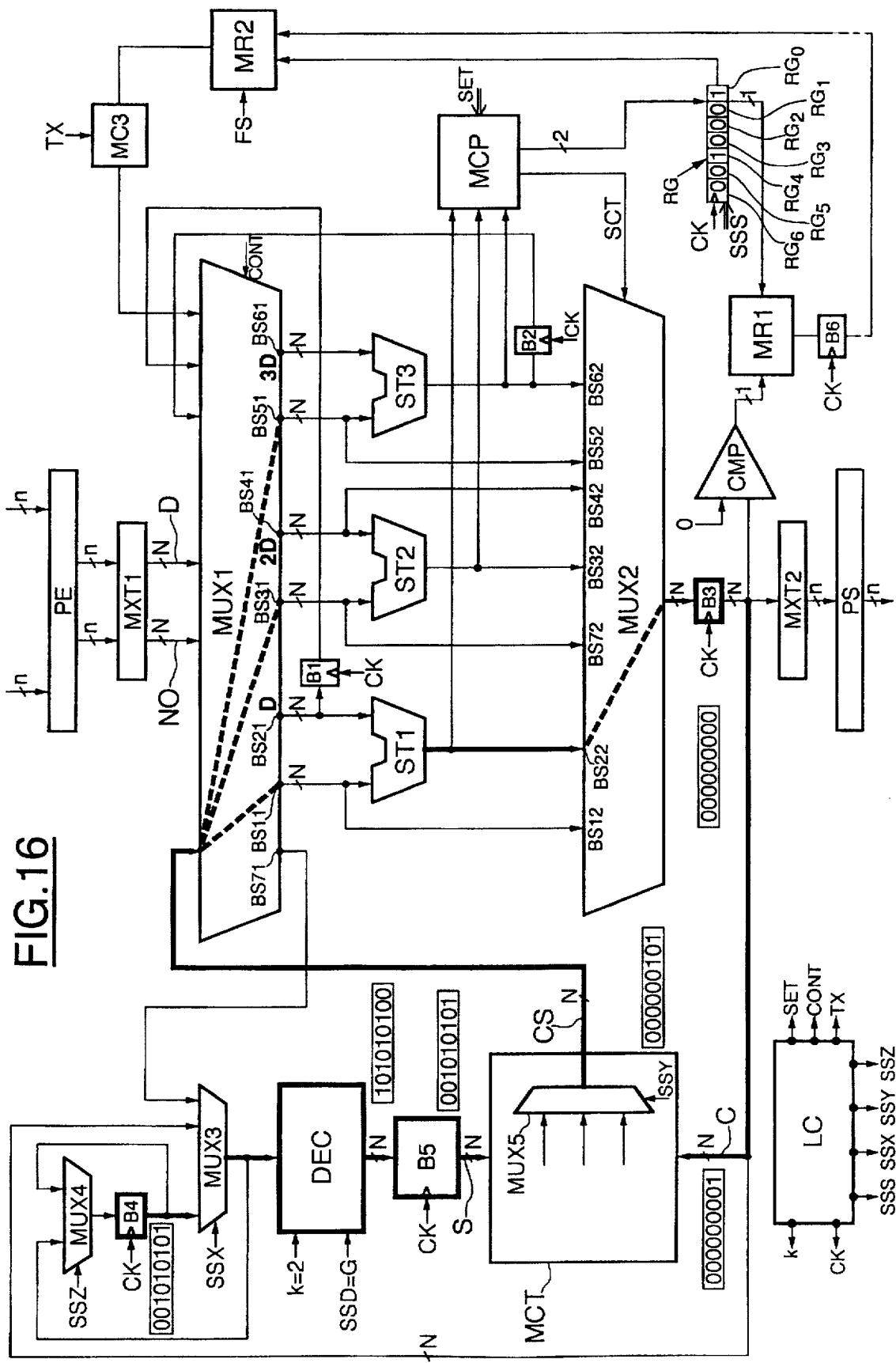

In FIG. 13, the initial shift value is equal to the value 4. The first shifted number stored in the flip-flop B5 is therefore equal to 000000101.

This number leads (FIG. 14) to a partial-remainder word, stored in the flip-flop B3, equal to 000000000 and to a partial-result word, stored in the slots $RG_0$ and $RG_1$ of the shift register, equal to 01.

The next shift value, which differs by 2 bits with respect to the initial shift value, is therefore equal to two and leads to a shifted word S, stored in the flip-flop B5, with a view to the next cycle, equal to 000010101.

During this next cycle (FIG. 15) the partial dividend CS resulting from the concatenation of the shifted word S and of the word C which was contained in the flip-flop B3, leads to a new partial-remainder word equal to 000000001 and a new partial-result word equal to 00.

The next shift value is in fact the value zero, this being equivalent to performing no shift on the dividend NO equal to 001010101.

During the next cycle, (illustrated in FIG. 16) the partial-remainder word, obtained from the concatenated word CS, itself obtained from the unshifted dividend NO and from the partial-remainder word of the preceding cycle (illustrated in FIG. 15), has the value zero, whereas the new partial-result word is equal to 01. Therefore, a final-result word on 6 bits representing the integer part of the result of the division is obtained in the shift register RG.

At this juncture there is therefore no bit of the final-result word which is representative of a digit following the decimal point. If the user wishes to obtain digits following the decimal point, it is then advisable to prepare in respect of the next cycle a new shift value which differs by two bits with respect to the previous shift value but is associated with an opposite direction of shift, that is to say leftwards. This would then lead to the shifted word S equal to 101010100.

The use of this shifted word in the next cycle would make it possible to obtain two new bits of partial-remainder words representing two digits following the decimal point.

In this configuration of even shift values, and under the assumption in which in particular no rounding operation is performed on the final-result word, the means MC3 select all of the bits of the shift register RG.

As explained above, the thresholding function performed subsequently by the thresholding means guarantees the validity of this result within the desired dynamic range, for example 4 bits.

In all of the foregoing, it was assumed that the dividend and the divisor were positive numbers.

Of course, the invention allows numbers of any sign to be processed.

in this case, there is provision for the component to calculate the absolute value of the dividend and the absolute value of the divisor, these absolute values being stored in the flip-flops B4 and B1 respectively.

The absolute value function can be performed by means for determining the absolute value which include two or three subtracters as well as the means MCP.

More precisely, the number whose absolute value it is wished to calculate is delivered to one of the inputs of one of the subtracters (for example the input BS11 of the subtracter ST1) as well as to one of the inputs of the second subtracter (for example the input BS41 of the subtracter ST2) whereas the value "zero" is delivered to the other input of each subtracter (for example the inputs BS21 and BS31). That output word from the two subtracters whose most significant bit will be representative of a positive difference, and therefore of the absolute value of the number, will be output by the multiplexer MUX2, through an appropriate instruction emanating from the means MCP.

This determination of the absolute values is performed for the dividend and for the divisor. In tandem, the means MCP save the sign of each of the two numbers, in a special register, this sign being equal to the most significant bit of each number. They moreover set up the EXCLUSIVE OR function for these two signs so as to store this value in a special register FS. The value of the bit stored in this register FS will next be used by the means MR2 to retrieve the correct sign of the word of the final result contained in the register RG.

More precisely, the means MR2 then carry out the function $(-1)^{FS} \cdot (Q+L)$ which amounts to performing either the sum Q+L or the additive inverse of this sum (Q denotes the final-result word and L the rounding bit).

In a preferred embodiment of the invention, not represented here for the purposes of simplification, one of the subtracters may be replaced by an arithmetic and logic unit. This arithmetic and logic unit is of course capable of performing a subtraction operation, but may also be advantageously used to perform the operation determining the absolute value of the number or else determining the function $(-1)^{FS} \cdot (Q+L)$, it then being possible to omit the means MR2 in this embodiment.

The function for determining absolute value and the thresholding function, and also functions for simple differencing between two numbers, which were described in combination with the division function, may of course be performed independently of any division operation. It is in fact the means MCP which, depending on the value of the state signal SET, will allow the execution of these various functions, in combination with the subtracters (in the broad sense of the term). In the above account, these means were in part described functionally. Those skilled in the art will readily be able to embody them in hardware, for example with the aid of logic synthesis algorithms. The same is the case for the control logic LC.

Although the extension of the number of bits of the internal data paths does not prove to be indispensible for the construction of a division operation alone, it does however allow the avoidance of internal overflows for example during successive subtractions, or else during internal calculations which combine successive divisions and/or successive subtractions. Minimizing these risks of internal overflows thus makes it possible to minimize the inaccuracies of the output words finally delivered by the component after possible thresholding.

What is claimed is:

1. Electronic component, capable of performing at least one binary division of two numbers to the base $2^b$, b being an integer greater than one, comprising $2^b-1$ subtracters connected to the input of the component, controllable means of shifting binary words, connected to the input of the component, controllable means concatenating binary words, connected up between the output of the shifting means and the output and the input of the subtracters, and a shift register for receiving in succession partial-result words of b bits together forming a final-result word representative of the division to the base $2^b$ of the two numbers and further comprising thresholding means delivering in response to a base word threshold by two threshold words representing minimum and maximum threshold values.

2. Component according to claim 1, characterized in that the $2^b-1$ subtracters are able to receive $2^b-1$ first words respectively equal to the $2^b-1$ successive multiples of a chosen positive divisor, and $2^b-1$ second words, in that it comprises means for selecting, from among the $2^b-1$ output words from the subtracters and the $2^b-1$ second words, a partial-remainder word on the basis of an information item derived from the output words, and associating therewith a corresponding predetermined partial-result word of b bits, in that the concentrating means are able to form a concatenated word from a first initial word shifted b bits towards the most significant bit and supplemented with the b least significant bits of a second initial word, in that the shifting means are able to form a succession of shifted words from successive shifts, with chosen value and direction of shift, of a chosen positive dividend, and in that it comprises control means for delivering at least one ordered set of successive shift values, all associated with a direction of shift towards the least significant bit and decreasing successively from a chosen initial value while differing mutually by b bits, and then, if the initial shift value is not a multiple of b, at least one additional shift value equal to b and associated with a direction of shift towards the most significant bit, so as sequentially to deliver successive second words respectively equal to the initially shifted dividend and then to the successive concatenated words obtained respectively from the successive partial-remainder words, in the guise of first initial words, and from the successive shifted words, in the guise of second initial words, and so as to store the successive partial-result words in the shift register, in such a way as to form the final-result word representative of the division to the base $2^b$ of the dividend by the divisor.

3. Component according to claim 2 characterized in that the thresholding means include two of the $2^b-1$ subtracters, one of the subtracters receiving the minimum threshold value and the base word, the other subtracter receiving the maximum threshold value and the base word, as well as in the said selection means, possessing a thresholding state in which they select the thresheld base word among the two threshold values and the base word, depending on the said information item derived from the output words from these two subtracters.

4. Component according to claim 2, characterized in that the numerical words processed by the component are 2's complement coded and in that the said information item derived from the output words from the subtracters is the result of comparing the most significant bits of these output words with the value 0 or 1.

5. Component according to claim 2, characterized in that it comprises means (MR1) for rounding the final result word contained in the shift register receiving the least significant bit of the word contained in the shift register as well as an information item representative of the comparison of the corresponding partial remainder word with the value 0 or 1, and delivering a rounding bit.

6. Component according to claim 5, characterized in that the rounding means include controllable incrementing means for incrementing or not incrementing the final-result word contained in the shift register depending on the value of the rounding bit.

7. Component according to claim 2, characterized in that it comprises an input port for receiving some at least of the data to be processed by the component, an output port for delivering the data resulting from these processing operations and temporal storage means connected between the outputs and the inputs of the subtracters, in that the control means include control logic and input multiplexing means, input-connected to the said input port, and output-connected to the inputs of the subtracters, and controlled by the said logic control, and in that the selection means include means for comparing the most significant bits of the output words from the subtracters with the value 0 or 1, and output multiplexing means, input-connected to the outputs of the subtracters and to some of the outputs of the input multiplexing means, controlled by the said comparison means, and connected, at output, to an input of the input multiplexing means via the concatenation means and shifting means.

8. Component according to claim 7, characterized in that the temporal storage means include a first D flip-flop connected between the output multiplexing means and the output port, in that the shifting means include a second D flip-flop, connected to an output of the input multiplexing means (MUX1) for storing the chosen positive dividend, first auxiliary multiplexing means connected, at input, to the output of the second D flip-flop, to the output of the first D flip-flop, and to the output of the input multiplexing means, and controllable by the said control logic, a shifter controllable by the said control logic and connected to the output of the first auxiliary multiplexing means, as well as a third D flip-flop connected to the output of the shifter so as to store the successive shifted words, and in that the concatenation means include second auxiliary multiplexing means connected between the outputs of the first and third D flip-flops, and an input of the input multiplexing means.

9. Component according to claim 1, characterized in that the thresholding means deliver a threshold final-result word from a base word derived from the contents of the shift register and from the two minimum and maximum threshold values taking into account the dynamic range desired for the final-result word.

10. Component according to claim 1, characterized in that it comprises means for determining the absolute value of a difference which are able to deliver, if appropriate, the positive divisor and/or positive dividend from a divisor and/or dividend of any signs received by an input port of the component and in that it comprises sign retrieval means able to retrieve the sign of the final-result word from the sign of the divisor and from the sign of the dividend.

11. Component according to claim 10, characterized in that the absolute value determining means include two of the $2^b-1$ subtracters, as well as the said selection means, possessing a so-called absolute value state in which they select the output word from one of the two subtracters, depending on the said information item derived from the output words from these two subtracters.

12. Component according to claim 1, characterized in that one of the subtracters is formed by an arithmetic and logic unit.

13. Component according to claim 12, characterized in that the arithmetic and logic unit incorporates the absolute value determining means and at least a part of the sign retrieval means.

14. Component according to claim 1, characterized in that it is intended to be connected to external input data paths and that it comprises means for extending the size of the internal data paths of the component with respect to the size of the external input data paths.

15. Component according to claim 1, wherein b is an integer equal to two.

* * * * *